United States Patent
Liu et al.

(10) Patent No.: US 10,155,832 B2
(45) Date of Patent: Dec. 18, 2018

(54) POLYMER DISPERSION AND ITS APPLICATION IN HIGH PIGMENT VOLUME CONCENTRATION PAINTS

(71) Applicant: Rohm and Haas Company, Philadelphia, PA (US)

(72) Inventors: Han Liu, Shanghai (CN); Xiangting Dong, Shanghai (CN); Qingwei Zhang, Shanghai (CN); Caifeng Wang, Shanghai (CN)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 15/523,948

(22) PCT Filed: Nov. 13, 2014

(86) PCT No.: PCT/CN2014/090977
§ 371 (c)(1),
(2) Date: May 3, 2017

(87) PCT Pub. No.: WO2016/074186
PCT Pub. Date: May 19, 2016

(65) Prior Publication Data
US 2017/0335040 A1    Nov. 23, 2017

(51) Int. Cl.
| | | |
|---|---|---|
| *C08F 220/18* | (2006.01) | |
| *C09D 133/06* | (2006.01) | |
| *C09D 133/08* | (2006.01) | |
| *C09D 7/63* | (2018.01) | |
| *C09D 5/02* | (2006.01) | |
| *C08F 212/08* | (2006.01) | |
| *C08F 220/06* | (2006.01) | |
| *C08F 230/02* | (2006.01) | |
| *C08K 5/05* | (2006.01) | |
| *C08K 5/17* | (2006.01) | |

(52) U.S. Cl.
CPC ............ *C08F 220/18* (2013.01); *C09D 5/024* (2013.01); *C09D 7/63* (2018.01); *C09D 133/06* (2013.01); *C09D 133/08* (2013.01); *C08F 212/08* (2013.01); *C08F 220/06* (2013.01); *C08F 230/02* (2013.01); *C08F 2220/1825* (2013.01); *C08K 5/05* (2013.01); *C08K 5/17* (2013.01)

(58) Field of Classification Search
CPC .... C08F 220/18; C08F 220/06; C08F 230/02; C08F 212/08; C08F 2220/1825; C09D 133/08; C09D 133/06

USPC .......................................................... 524/560
See application file for complete search history.

(56) References Cited

U.S. PATENT DOCUMENTS

| | | | |
|---|---|---|---|
| 7,357,949 B2 | 4/2008 | Trogolo et al. | |
| 7,579,081 B2 | 8/2009 | Brown | |
| 8,034,869 B2 | 10/2011 | Bobsein et al. | |
| 8,318,848 B2 | 11/2012 | Finegan et al. | |
| 8,389,602 B2 * | 3/2013 | Yanagi | C09D 11/322 |
| | | | 427/256 |
| 2008/0153969 A1 | 6/2008 | Hermes et al. | |
| 2008/0269402 A1 * | 10/2008 | Maurice | C08F 220/14 |
| | | | 524/547 |

FOREIGN PATENT DOCUMENTS

| | | |
|---|---|---|
| CN | 101538438 A | 9/2009 |
| EP | 1582567 A1 | 10/2005 |
| EP | 2077301 A2 | 7/2009 |
| WO | 2010074865 A1 | 7/2010 |
| WO | 2012087264 A1 | 6/2012 |
| WO | 2013004004 A1 | 1/2013 |
| WO | 2014056184 A1 | 4/2014 |

OTHER PUBLICATIONS

International Search Report for International Application No. PCT/CN2014/090977; Date of Filing: Nov. 13, 2014; dated Aug. 14, 2015; 4 pages.

Written Opinion of the International Searching Authority for International Application No. PCT/CN2014/090977; Date of Filing: Nov. 13, 2014; dated Aug. 14, 2015; 3 pages.

* cited by examiner

*Primary Examiner* — Hui H Chin
(74) *Attorney, Agent, or Firm* — Karl E. Stauss; Cantor Colburn LLP

(57) ABSTRACT

The present invention provides a dispersion of polymer particles comprising, as polymerized units, by dry weight based on total dry weight of the polymer particles, from 85% to 99.9% ethylenically unsaturated nonionic monomers, from 0.01% to 4% phosphorous-containing (meth)acrylate monomers, and at least one neutralizer. The final pH of the polymer dispersion is above 6, and from 50% to 100% by mole of the total neutralizers are alcohol amines. The present invention further provides a paint comprising said dispersion. The paint has both satisfactory paint viscosity stability and improved paint performances such as scrub resistance, stain resistance, corrosion resistance and durability.

14 Claims, No Drawings

POLYMER DISPERSION AND ITS APPLICATION IN HIGH PIGMENT VOLUME CONCENTRATION PAINTS

FIELD OF THE INVENTION

The present invention relates to a polymer dispersion. The present invention further relates to a paint, especially a high pigment volume concentration (PVC) paint, comprising the polymer dispersion.

INTRODUCTION

Benefits of phosphorus-containing monomers such as phosphoethyl methacrylate (PEM) have been long recognized in the paint industry. Paints, especially high PVC paints comprising polymer dispersions polymerized from such phosphorus-containing monomers, have dramatically improved paint performances such as scrub resistance, stain resistance, corrosion resistance and durability. However, research has also shown that the content of phosphorus-containing monomers in a paint is inversely correlated to paint viscosity stability.

It is therefore desired in the paint industry to have a phosphorus-containing polymer dispersion that provides a paint with both satisfactory paint viscosity stability and improved paint performances like scrub resistance, stain resistance, corrosion resistance and durability.

SUMMARY OF THE INVENTION

The present invention provides a dispersion of polymer particles comprising, as polymerized units, by dry weight based on total dry weight of the polymer particles, from 85% to 99.9% ethylenically unsaturated nonionic monomers, from 0.01% to 4% phosphorous-containing (meth)acrylate monomers, and at least one neutralizer. The final pH of the polymer dispersion is above 6, and from 50% to 100% by mole of the total neutralizers are alcohol amines.

The present invention further provides a paint comprising said dispersion. The paint has both satisfactory paint viscosity stability and improved paint performances such as scrub resistance, stain resistance, corrosion resistance and durability.

DETAILED DESCRIPTION OF THE INVENTION

Polymer Dispersion

The polymer dispersion of the present invention comprises polymer particles comprising, as polymerized units, by dry weight based on total dry weight of the polymer particles, (a) from 85% to 99.9%, preferably from 90% to 99%, and more preferably from 92% to 98%, ethylenically unsaturated nonionic monomers; and (b) from 0.01% to 4%, preferably from 0.1% to 3.5%, and more preferably from 0.3% to 2.5%, phosphorous-containing (meth)acrylate monomers.

Optionally, the polymer particles further comprise, as polymerized units, by dry weight based on total dry weight of the polymer particles, (c) from 0.01% to 5%, preferably from 0.1% to 3%, and more preferably from 0.3% to 2%, stabilizer monomers.

The polymer dispersion further comprises neutralizers to adjust the final pH of the polymer dispersion to above 6, preferably above 6.5, and more preferably above 7.

Among the neutralizers, from 50% to 100%, preferably from 60% to 100%, and more preferably from 70% to 100% by mole of the total neutralizers are alcohol amines.

As used herein, the term "nonionic monomers" refers to monomers that do not bear an ionic charge between pH=1-14. Examples of suitable ethylenically unsaturated nonionic monomers include alkyl esters of (methyl) acrylic acids such as methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate, hydroxyethyl methacrylate, hydroxypropyl methacrylate, and any combination thereof; (meth)acrylonitrile; (meth)acrylamide; amino-functional and ureido-functional monomers such as hydroxyethyl ethylene urea methacrylate; monomers bearing acetoacetate-functional groups such as acetoacetoxyethyl methacrylate (AAEM); monomers bearing carbonyl-containing groups such as diacetone acrylamide (DAAM); ethylenically unsaturated monomers having a benzene ring such as styrene and substituted styrenes; butadiene; α-olefins such as ethylene, propylene, and 1-decene; vinyl acetate, vinyl butyrate, vinyl versatate and other vinyl esters; vinyl monomers such as vinyl chloride and vinylidene chloride; glycidyl (meth)acrylate; and any combination thereof.

In a preferred embodiment, the ethylenically unsaturated nonionic monomer is selected from styrene, $C_2$-$C_{12}$ alkyl esters of (methyl) acrylic acids, derivatives thereof, and any combination thereof.

Examples of suitable phosphorus-containing (meth)acrylate monomers include phosphoalkyl (meth)acrylates such as phosphoethyl (meth)acrylate, phosphopropyl (meth)acrylate, phosphobutyl (meth)acrylate, salts thereof, and any combination thereof; phosphoalkoxy (meth)acrylates such as phospho ethylene glycol (meth)acrylate, phospho di-ethylene glycol (meth)acrylate, phospho tri-ethylene glycol (meth)acrylate, phospho propylene glycol (meth)acrylate, phospho di-propylene glycol (meth)acrylate, phospho tri-propylene glycol (meth)acrylate, salts thereof, and any combination thereof. The phosphorous-containing (meth)acrylate monomers preferably are selected from mono- or di-ester of phosphoalkyl (meth)acrylates, more preferably are mono- or di-ester of phosphoethyl methacrylate, and most preferably are phosphoethyl methacrylate (PEM).

Examples of the stabilizer monomers include sodium styrene sulfonate (SSS), sodium vinyl sulfonate (SVS), 2-acrylamido-2-methylpropanesulfonic acid (AMPS), acrylamide (AM), acrylic acid (AA), methylacrylic acid (MAA), itaconic acid (IA), and any combination thereof.

The polymerization of the polymer particles can be any method known in the art, including emulsion polymerization, mini-emulsion polymerization, and mechanical dispersing technology. Suitable examples of polymerization process include those disclosed in U.S. Pat. No. 7,579,081 B2, U.S. Pat. No. 7,357,949 B2 and WO 2010074865 A1.

Examples of suitable alcohol amines include ethanolamines, such as mono ethanol amine, propanol amine, diethanolamine (DEA), triethanolamine (TEA), 2-amino-2-methyl-1-propanol and/or 2-aminol-2-ethyl-1,3-propanediol, N-methyldiethanolamine (NMDEA), monomethylethanolamine (MMEA), 2-(2-aminoethoxy) ethanol, N,N-dimethyl-2-(2-aminoethoxy) ethanol (DMDGA) and tetramethyl bis (aminoethyl) ether.

Other neutralizers suitable for binder preparation may also be used in the polymer dispersion, and suitable examples include ammonium hydroxide, sodium hydroxide, sodium carbonate, sodium bicarbonate, potassium hydroxide, potassium carbonate, potassium bicarbonate, ammonia, and any combination thereof.

Paint

The polymer dispersion of the present invention can be made into a paint by addition of pigments, extenders, and additives.

Pigments of the present invention are typically inorganic pigment particles, and preferably particulate inorganic materials which are capable of materially contributing to the opacity or hiding capability of a paint. Such materials typically have a refractive index of equal to or greater than 1.8 and include titanium dioxide ($TiO_2$), zinc oxide, zinc sulfide, barium sulfate, and barium carbonate. Titanium dioxide ($TiO_2$) is preferred.

Extenders are typically a particulate inorganic materials having a refractive index of less than or equal to 1.8 and greater than 1.3 and include calcium carbonate, clay, calcium sulfate, aluminosilicate, silicate, zeolite, mica, diatomaceous earth, solid or hollow glass, and ceramic bead.

The paint of the present invention may further contain at least one conventional paint additives such as coalescing agents, cosolvents, surfactants, buffers, neutralizers, thickeners, non-thickening rheology modifiers, dispersants, humectants, wetting agents, mildewcides, biocides, plasticizers, antifoaming agents, defoaming agents, anti-skinning agents, colorants, flowing agents, crosslinkers, and antioxidants. The uses of these additives are known in the art.

PVC (pigment volume concentration) of a paint is calculated as follows, $$PVC\ (\%) = [\text{volume of pigment(s)} + \text{volume of extender(s)}] / \text{total dry volume of paint}.$$

In a preferred embodiment, the paint PVC is higher than 70%, preferably higher than 75%, and more preferably higher than 85%.

Preparation of the Paint

The preparation of the paint involves the process of selecting and admixing appropriate paint ingredients in the correct proportions to provide a paint with specific processing and handling properties, as well as a final dry paint film with the desired properties.

Application of the Paint

The paint may be applied by conventional application methods such as brushing, roller application, and spraying methods such as air-atomized spray, air-assisted spray, airless spray, high volume low pressure spray, and air-assisted airless spray.

Suitable substrates for paint application include concrete, cement board, medium-density fiberboard (MDF) and particle board, gypsum board, wood, stone, metal, plastics, wall paper and textile, etc. Preferably, all the substrates are pre-primed by waterborne or solvent-borne primers.

EXAMPLES

I. Raw Materials

Some embodiments of the invention will now be described in the following Examples, wherein all parts and percentages are by weight unless otherwise specified.

DISPONIL™ FES 32 anionic surfactant is available from Cognis.

Phospho ethyl methylacrylate ("PEM") and AMP-95 are available from The Dow Chemical Company.

Butyl acrylate ("BA"), styrene ("ST"), and acrylic acid ("AA") are all available from Shanghai LangYuan Chemical Co., Ltd.

SILQUEST™ A-171 silane ("A-171") is vinyltrimethoxysilane and is available from Momentive Company.

Sodium persulphate ("SPS"), sodium hydroxide ("NaOH"), mono ethanol amine ("MEA") and sodium styrene sulfonate ("SSS") are all available from Shanghai Chemical Reagent Co. Ltd.

Propylene glycol and ethylene glycol are used as co-solvents and are available from Shanghai Chemical Reagent Co. Ltd.

Hydroxy ethyl cellulose ("HEC") is used as a thickener and is available from Shanghai Chemical Reagent Co. Ltd.

AMP-95™, available from The Dow Chemical Company, is 2-methyl-2-amino propanol and used as a neutralizer (AMP-95 is a trademark of The Dow Chemical Company).

OROTAN™ 1288, available from The Dow Chemical Company, is a polyacid and is used as a dispersant (OROTAN is a trademark of The Dow Chemical Company).

DISPELAIR™ CF-246 defoamer is available from Blackburn Chemicals.

DB-80, available from Jinyang Gaoling Ltd. Co. (China), is calcined kaolin and used as an extender.

ASP-170, available from Engelhard, is washed kaolin and used as an extender.

TI-PURE™ R-706 titanium dioxide is used as pigment and is available from DuPont.

Talc-800, available from Meijia Chemical Company, is talcum powder and used as an extender.

CC-700, available from Guangfu Building Materials Group (China), is calcium carbonate and used as an extender.

TEXANOL™ ester alcohol, available from Eastman, is 2,2,4-trimethyl-1,3-pentanediolmono(2-methylpropanoate) and is used as a coalescent.

KATHON™ LX, available from DOW Chemical Company, is a mix of 5-Chloro-2-Methyl-4-Isothiazolin-3-One and 2-Methyl-4-Isothiazolin-3-one and is used as a biocide.

II. Test Methods

1. Volume Solids Content

The volume solids content of a paint is calculated as follows. The total volume of pigments and extenders in the paint is denoted as $V_p$. The total volume of non-volatile solids except pigments and extenders in the paint (also known as "volume of solid binder") is denoted as $V_b$. The total volume of the paint (also known as "total wet paint volume") is denoted as $V_w$. The volume solids content of the paint is measured according to the following equation:

$$\text{Volume solids} = [(V_p + V_b)/V_w] \times 100\%$$

2. Heat-Age Stability

A Stormer Viscosity Meter is used to test the viscosity of a paint according to the ASTM D562 method. After the paint is formed, an initial medium shear viscosity, Initial KU, of the paint is tested at room temperature, then the paint is balanced at room temperature overnight. Then, the viscosity of the paint is measured and recoded as Overnight KU. The paint is then placed in an oven at 50° C. for 10 days. The viscosity of the paint after storage is tested and recorded as Final KU. The difference between Initial KU and Final KU is defined as the viscosity change, ΔKU. The smaller the ΔKU value, the better the heat-age stability will be. ΔKU needs to be 15 KU or less to be acceptable.

3. Scrub Test

Scrub resistance of paints is determined using a modified version of the ASTM D 2486-74A method. Compared to the ASTM D 2486-74A method, there are four modifications in the test method used herein:

(1) The scrub medium used is a 0.5% by weight household detergent solution for paints with PVC greater than 55%, or an abrasive scrub medium for paints with PVC less than 55%;

(2) The paint films are laid down on vinyl charts vertical to the longer side of the vinyl charts;

(3) There are no shims on the aluminum metal plates of scrub machines; and (4) Material used for making hairs of test brushes: the brushes used herein are made of pig hairs rather than nylon fibers. On each vinyl chart, four paints are applied with always making one of them derived from the same paint as control (Comparative Example 1) and three others being samples so that relative ratings between control and samples can be obtained. For a given paint, four paint specimens are made and the final rating is obtained by averaging the results of the four specimens. The paint specimens are dried for 7 days in a constant temperature room with a temperature of 25° C. and a humidity of 50% prior to the scrub test.

III. Examples

1. Preparation of Polymer Dispersion a (Binder A)

A monomer emulsion was prepared by combining 822.14 grams (g) of BA, 794.49 g of ST, 16.86 g of AA, 38.40 g of PEM, 5.16 g of A-171, 399.49 g of DI Water, and 70.55 g of a 31.0% by weight aqueous solution of DISPONIL FES 32, and emulsified with stirring. Then, 10.23 g of a 31% by weight aqueous solution of DISPONIL FES 32 and 750 g of DI water were charged to a five liter multi-neck flask fitted with mechanical stirring. The materials in the flask were heated to 90° C. under a nitrogen atmosphere. To the stirred flask, 54.8 g of the monomer emulsion obtained above were added followed by 5.96 g of SPS in 27.40 g of DI water. The remaining monomer emulsion and a solution of 3.41 g of SPS in 207.34 g of DI water were then added to the flask over 120 minutes while the reactor temperature was maintained at 88° C. When half of the remaining monomer emulsion was added into the flask, a solution of 6.22 g of NaOH and 97.40 g of DI water were added into the flask over 60 minutes. Then, 32.00 g of DI water was used to rinse the emulsion feed line to the reactor. The reaction mixture was then cooled down to room temperature. During cooling the reaction mixture, 0.016 g of ferrous sulfate and 0.016 g of EDTA, 5.88 g of t-butyl hydroperoxide (70%) and 2.81 g of isoascorbic acid in aqueous solutions were added into the flask. The obtained dispersion was neutralized to a pH of 7 to 8 with NaOH solution. Binder A has the following physical properties: 45.0% solids, particle size of 88 nm, pH of 7.61.

2. Preparation of Polymer Dispersions B-F (Binder B-F)

Polymer dispersions B-F were prepared according to the same procedure as described above for preparing Polymer Dispersion A, wherein the neutralizer used were listed in Table 1 below.

TABLE 1

| Binder | Neutralizer (s) | final PH | Total Neutralizer (100% by mole) | | |
|---|---|---|---|---|---|
| | | | NaOH | AMP-95 | MEA |
| A | NaOH | 7.61 | 100% | — | — |
| B | NaOH + AMP-95 | 7.69 | 29.00% | 71.00% | — |
| C | NaOH + MEA | 7.64 | 30.42% | — | 69.58% |
| D | NaOH + MEA | 7.56 | 48.21% | — | 51.79% |
| E | NaOH + AMP-95 | 7.58 | 72.79% | 27.21% | — |
| F | NaOH + MEA | 7.60 | 72.14% | — | 27.86% |

3. Preparation of Comp. Paint 1, Paints 2-4, and Comp. Paints 5-6

Paints were prepared based on the formulation as described in Table 2. Ingredients of the grind were mixed using a high speed Cowles disperser. Binder (570 g) was added into the grind. Then, 60 g of TEXANOL were added into the resultant mixture. DISPELAIR CF-246 (12 g) and deionized water (1086.60 g) were further added to the mixture and mixed for 30 minutes using a conventional lab mixer. All the paint examples had 81.35% PVC and 32.63% volume solids ("VS").

TABLE 2

| Paints (gram) | |
|---|---|
| Grind | |
| water | 1200.00 |
| propylene glycol | 15.00 |
| ethylene glycol | 15.00 |
| HEC | 36.00 |
| AMP-95 | 6.00 |
| OROTAN 1288 | 22.80 |
| DISPELAIR CF-246 | 6.00 |
| DB-80 | 360.00 |
| ASP-170 | 354.00 |
| TI-PURE R-706 | 177.60 |
| Talc-800 | 450.00 |
| CC-700 | 1620.00 |
| KATHON LX | 9.00 |
| Sub-total | 4271.40 |
| LetDown | |
| Binder | 570.00 |
| TEXANOL | 60.00 |
| DISPELAIR CF-246 | 12.00 |
| water | 1086.60 |
| Total | 6000.00 |

IV. Results

TABLE 3

| | Comp. Paint 1 | Paint 2 | Paint 3 | Paint 4 | Comp. Paint 5 | Comp. Paint 6 |
|---|---|---|---|---|---|---|
| Binder Dispersion | A | B | C | D | E | F |
| NaOH (mole %) | 100% | 29.00% | 30.42% | 48.21% | 72.79% | 72.14% |
| AMP-95 (mole %) | — | 71.00% | — | — | 27.21% | — |
| MEA (mole %) | — | — | 69.58% | 51.79% | — | 27.86% |
| Initial KU | 111.0 | 110.5 | 110.7 | 110.1 | 110.2 | 110.4 |
| Overnight KU | 118.0 | 117.6 | 118.0 | 117.2 | 118.0 | 118.5 |

TABLE 3-continued

|  | Comp. Paint 1 | Paint 2 | Paint 3 | Paint 4 | Comp. Paint 5 | Comp. Paint 6 |
|---|---|---|---|---|---|---|
| Final KU | 134.5 | 128.7 | 129.7 | 128.3 | 132.1 | 133.3 |
| ΔKU | 16.5 | 11.1 | 11.7 | 11.1 | 14.1 | 14.8 |
| Scrub resistance | 100% | 108% | 122% | 104% | 100% | 104% |

As shown in Table 3, Paints 2 to 4, compared to Comparative Paints 1 and 5-6, comprised more than 50% by mole alcohol amines (AMP-95 and MEA are both commercially available alcohol amines) based on all neutralizers, and had significantly improved viscosity stability, and the paint performances brought by PEM monomer like scrub resistance is maintained. Paints 2 and 3, compared to Comparative Paints, even had significantly improved scrub resistance.

It is supported by the data that using the selected neutralizer of the present invention, phosphorus-containing paints had improved and satisfactory viscosity stability and maintained or even improved scrub resistance.

What is claimed is:

1. A dispersion of polymer particles comprising, as polymerized units, by dry weight based on total dry weight of the polymer particles, from 85% to 99.9% ethylenically unsaturated nonionic monomers, from 0.01% to 4% phosphorous-containing (meth)acrylate monomers, and at least one neutralizer;
    wherein the final pH of the polymer dispersion is above 6, and from 50% to 71% by mole of the total neutralizers are alcohol amines; and
    wherein the at least one neutralizer comprises sodium hydroxide.

2. The dispersion according to claim 1 wherein the polymer particles further comprises, as polymerized units, by dry weight based on total dry weight of the polymer particles, from 0.01% to 5% stabilizer monomers.

3. The dispersion according to claim 1 wherein the ethylenically unsaturated nonionic monomers are selected from alkyl esters of (methyl) acrylic acids, (meth)acrylonitrile, (meth)acrylamide, amino-functional and ureido-functional monomers, monomers bearing acetoacetate-functional groups, monomers bearing carbonyl-containing groups, ethylenically unsaturated monomers having a benzene ring, butadiene, α-olefins, vinyl esters, vinyl monomers, glycidyl (meth)acrylate, and any combination thereof.

4. The dispersion according to claim 3 wherein the ethylenically unsaturated nonionic monomers are selected from styrene, $C_2$-$C_{12}$ alkyl esters of (methyl) acrylic acids, and any combination thereof.

5. The dispersion according to claim 1 wherein the phosphorus-containing (meth)acrylate monomers are selected from phosphoalkyl (meth)acrylates and salts thereof, phosphoalkoxy (meth)acrylates and salts thereof, and any combination thereof.

6. The dispersion according to claim 5 wherein the phosphorus-containing (meth)acrylate monomers are mono- or di-ester of phosphoethyl methacrylates.

7. The dispersion according to claim 1 wherein the alcohol amines are selected from mono ethanol amine, propanol amine, diethanolamine (DEA), triethanolamine (TEA), 2-amino-2-methyl-1-propanol and/or 2-aminol-2-ethyl-1, 3-propane-diol, N-methyldiethanolamine (NM-DEA), monomethylethanolamine (MMEA), 2-(2-aminoethoxy) ethanol, N,N-dimethyl-2-(2-aminoethoxy) ethanol (DMDGA), tetramethyl bis (aminoethyl) ether, and any combination thereof.

8. A paint comprising the dispersion according to claim 1.

9. A paint comprising the dispersion according to claim 2.

10. A paint comprising the dispersion according to claim 3.

11. A paint comprising the dispersion according to claim 4.

12. A paint comprising the dispersion according to claim 5.

13. A paint comprising the dispersion according to claim 6.

14. A paint comprising the dispersion according to claim 7.

* * * * *